(12) United States Patent
Brown et al.

(10) Patent No.: US 12,705,223 B2
(45) Date of Patent: Aug. 11, 2026

(54) SELECTIVE ADDITION OF DATUM TO A TREE DATA STRUCTURE

(71) Applicant: Crowdstrike, Inc., Sunnyvale, CA (US)

(72) Inventors: Daniel W. Brown, Ipswich, MA (US); Johnathan Hoyt, Reading, MA (US); Sseziwa A. Mukasa, Salem, MA (US); Thomas R. Hobson, Brookline, MA (US)

(73) Assignee: Crowdstrike, Inc., Sunnyvale, CA (US)

( * ) Notice: Subject to any disclaimer, the term of this patent is extended or adjusted under 35 U.S.C. 154(b) by 13 days.

(21) Appl. No.: 17/902,628

(22) Filed: Sep. 2, 2022

(65) Prior Publication Data

US 2024/0078222 A1 Mar. 7, 2024

(51) Int. Cl.

*G06F 16/22* (2019.01)
*G06F 16/23* (2019.01)

(52) U.S. Cl.

CPC ...... *G06F 16/2246* (2019.01); *G06F 16/2379* (2019.01)

(58) Field of Classification Search

CPC ......................... G06F 16/2246; G06F 16/2379
See application file for complete search history.

(56) References Cited

U.S. PATENT DOCUMENTS 9,335,885 B1 * 5/2016 Brocato ................ G06F 3/0489
11,122,067 B2 9/2021 Yona et al.
2008/0065672 A1 * 3/2008 Bamford ............. G06F 16/2246 707/999.102
2014/0201838 A1 7/2014 Varsanyi et al.
2015/0026766 A1 1/2015 Holloway et al.
2015/0286704 A1 * 10/2015 Shyr ....................... G06F 16/35 707/737
2017/0140072 A1 * 5/2017 Sidorenko ............... G06F 17/11
2019/0387009 A1 * 12/2019 Kondaveeti ......... H04L 63/1425

OTHER PUBLICATIONS

Notice of Allowance for U.S. Appl. No. 18/622,494, mailed Nov. 6, 2025, 15 pages.

* cited by examiner

*Primary Examiner* — Sherief Badawi
*Assistant Examiner* — Earl Levi Elias
(74) *Attorney, Agent, or Firm* — Elliott, Ostrander & Preston, P.C.

(57) ABSTRACT

A value is assigned to a rate threshold for adding child nodes to a distinct parent node in a tree data structure. A first datum comprising a first variable assigned a first value and a second variable assigned a first value is added to the tree at a first timestamp, by adding to the first level in the tree a first parent node representing the first variable assigned the first value and adding to the second level in the tree a first child node representing the second variable assigned the first value and connected by a first directed edge from the first parent node. A second datum comprising the first variable assigned the first value and the second variable assigned a second value is received at a second timestamp. The method blocks adding to the second level in the tree a second child node representing the second variable assigned the second value and connected by a second directed edge from the first parent node when a rate based on the first timestamp and the second timestamp exceeds the rate threshold.

21 Claims, 7 Drawing Sheets

Figure 1A:
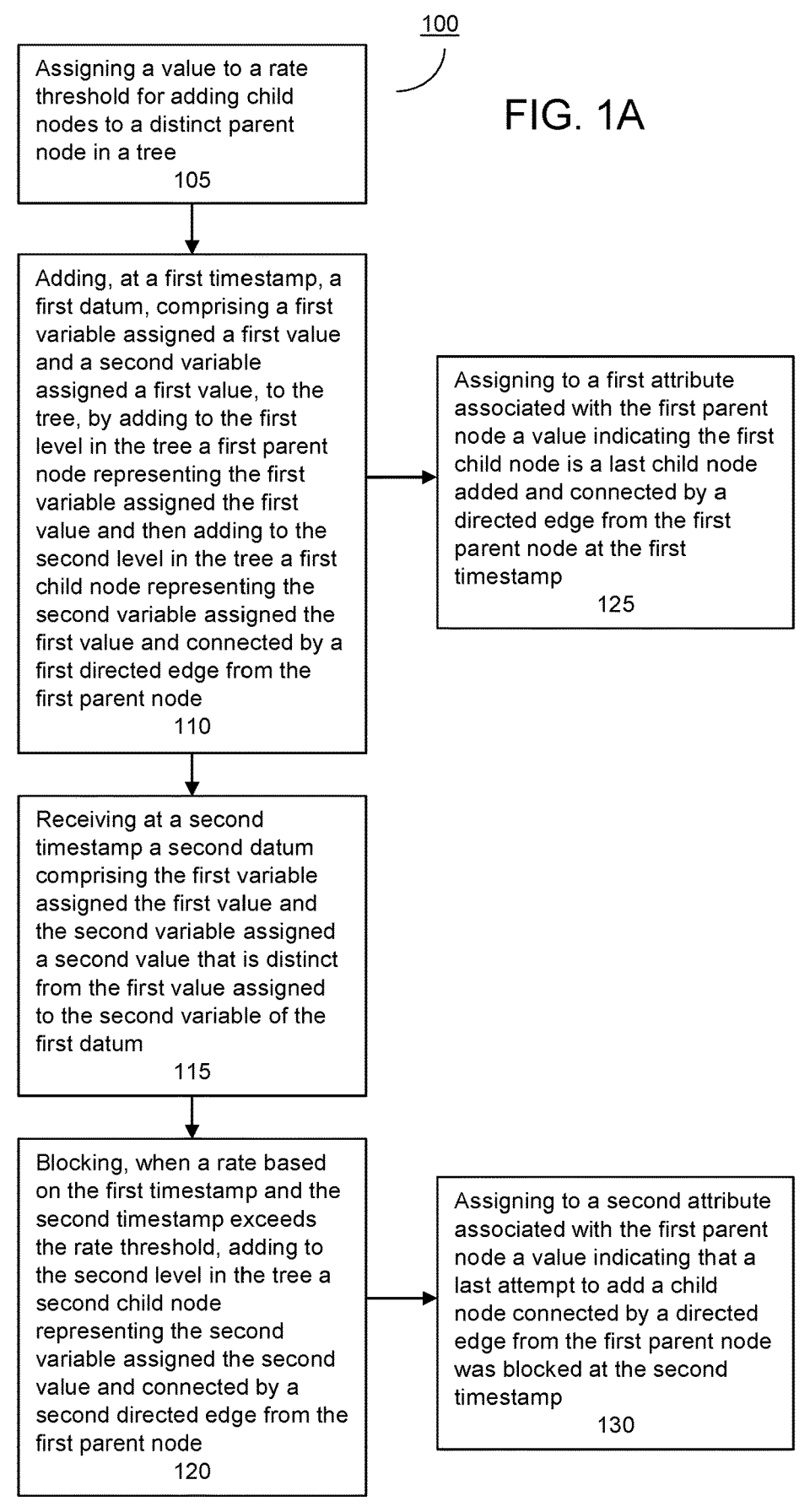

Assigning a value to a rate threshold for adding child nodes to a distinct parent node in a tree
105

Adding, at a first timestamp, a first datum, comprising a first variable assigned a first value and a second variable assigned a first value, to the tree, by adding to the first level in the tree a first parent node representing the first variable assigned the first value and then adding to the second level in the tree a first child node representing the second variable assigned the first value and connected by a first directed edge from the first parent node
110

Assigning to a first attribute associated with the first parent node a value indicating the first child node is a last child node added and connected by a directed edge from the first parent node at the first timestamp
125

Receiving at a second timestamp a second datum comprising the first variable assigned the first value and the second variable assigned a second value that is distinct from the first value assigned to the second variable of the first datum
115

Blocking, when a rate based on the first timestamp and the second timestamp exceeds the rate threshold, adding to the second level in the tree a second child node representing the second variable assigned the second value and connected by a second directed edge from the first parent node
120

Assigning to a second attribute associated with the first parent node a value indicating that a last attempt to add a child node connected by a directed edge from the first parent node was blocked at the second timestamp
130

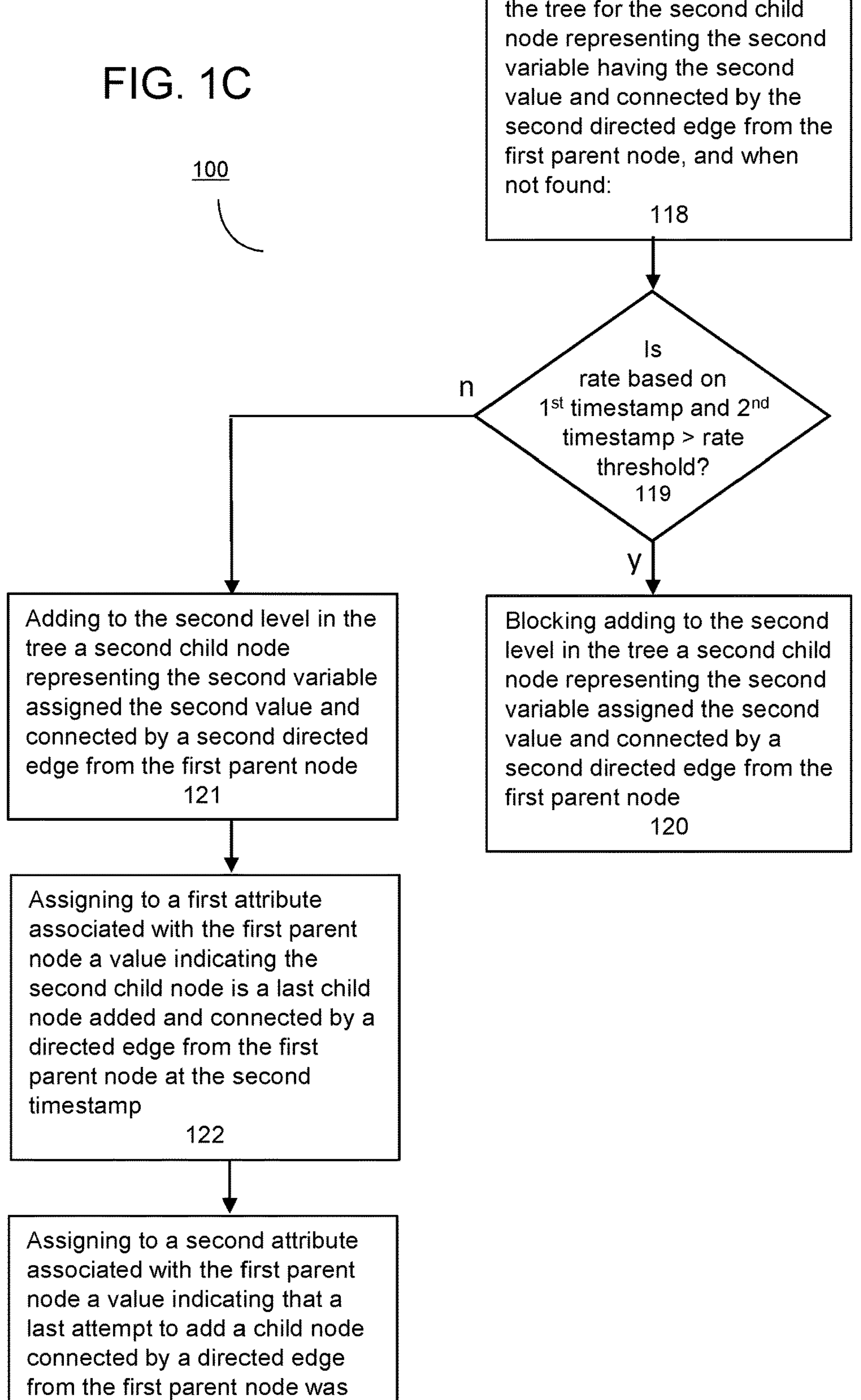
FIG. 1C
100
Searching the second level in the tree for the second child node representing the second variable having the second value and connected by the second directed edge from the first parent node, and when not found:
118
Is rate based on 1st timestamp and 2nd timestamp > rate threshold?
119
n
y
Adding to the second level in the tree a second child node representing the second variable assigned the second value and connected by a second directed edge from the first parent node
121
Blocking adding to the second level in the tree a second child node representing the second variable assigned the second value and connected by a second directed edge from the first parent node
120
Assigning to a first attribute associated with the first parent node a value indicating the second child node is a last child node added and connected by a directed edge from the first parent node at the second timestamp
122
Assigning to a second attribute associated with the first parent node a value indicating that a last attempt to add a child node connected by a directed edge from the first parent node was allowed at the second timestamp
123

Figure 1D:
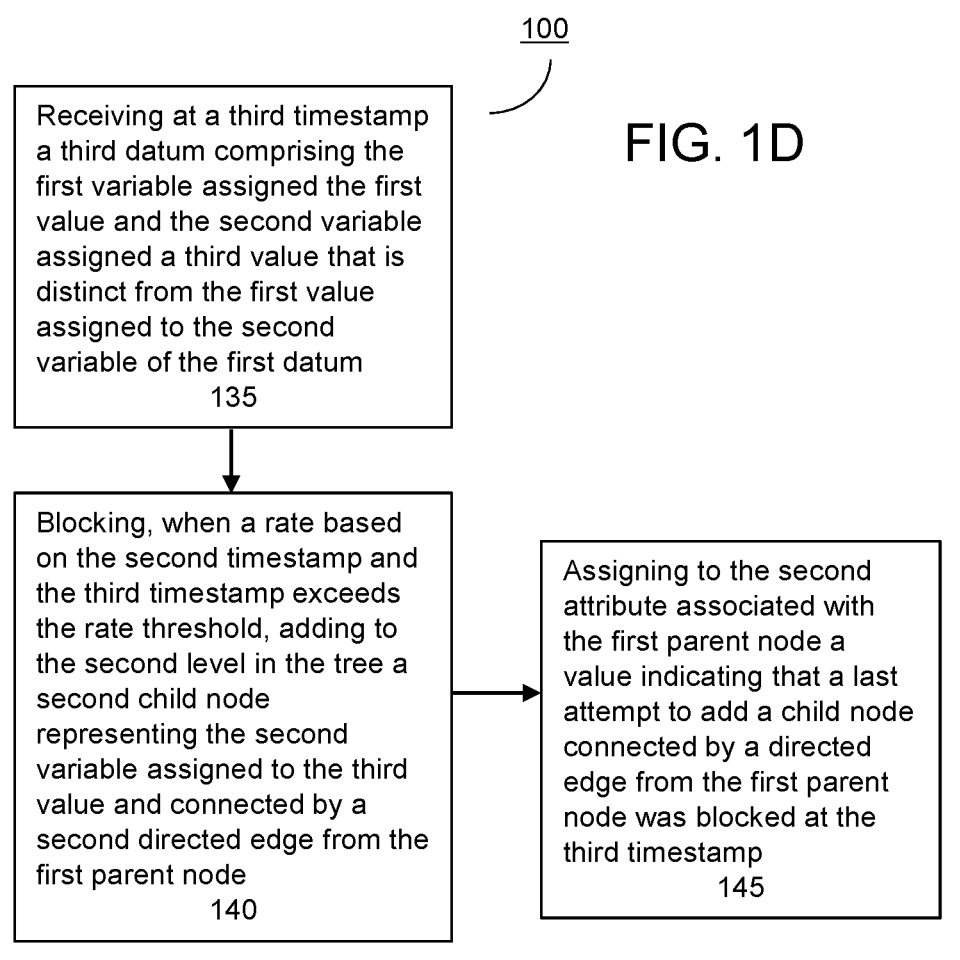

Receiving at a third timestamp a third datum comprising the first variable assigned the first value and the second variable assigned a third value that is distinct from the first value assigned to the second variable of the first datum
135

Blocking, when a rate based on the second timestamp and the third timestamp exceeds the rate threshold, adding to the second level in the tree a second child node representing the second variable assigned to the third value and connected by a second directed edge from the first parent node
140

Assigning to the second attribute associated with the first parent node a value indicating that a last attempt to add a child node connected by a directed edge from the first parent node was blocked at the third timestamp
145

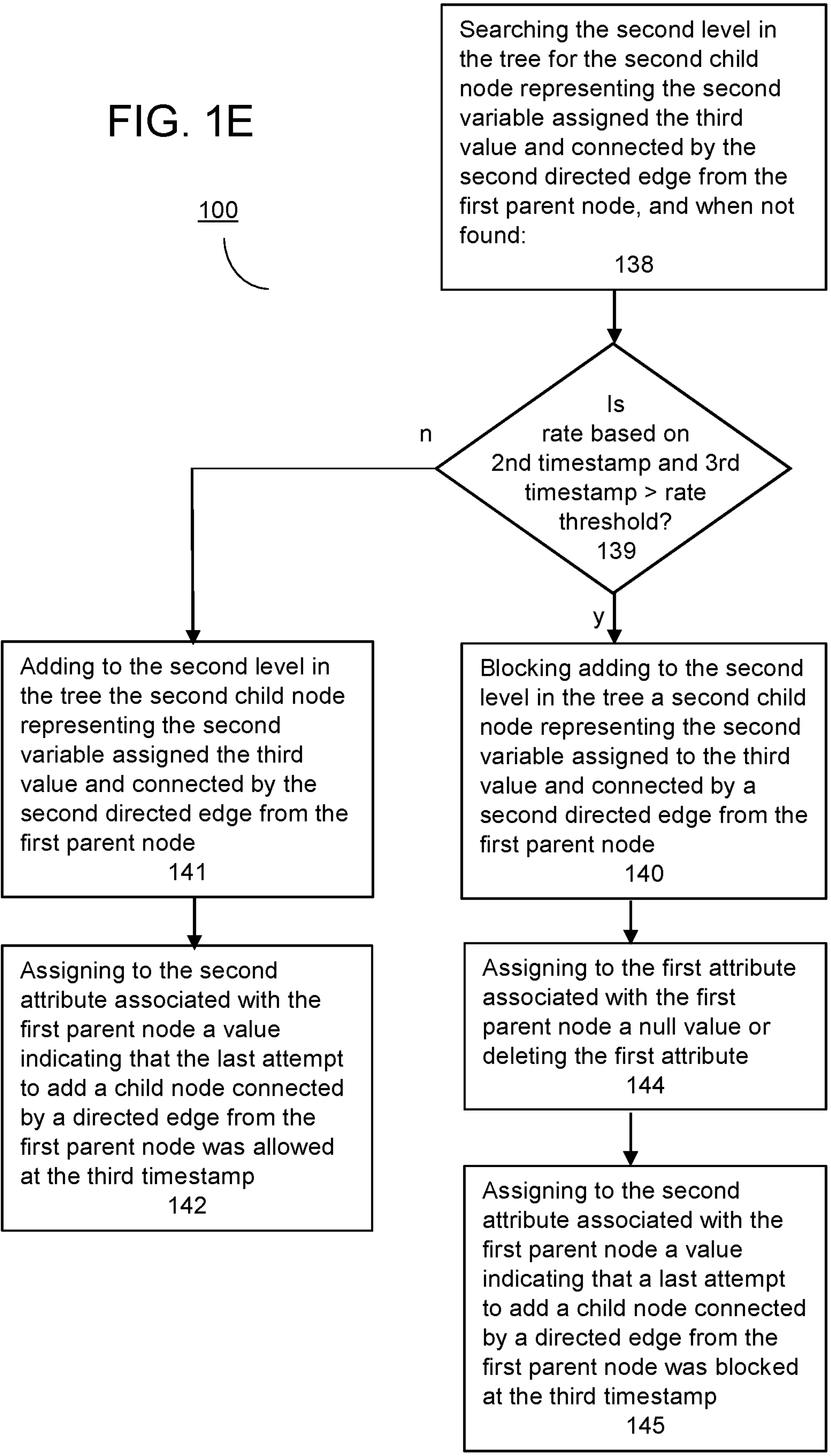
FIG. 1E
100
Searching the second level in the tree for the second child node representing the second variable assigned the third value and connected by the second directed edge from the first parent node, and when not found:
138
Is rate based on 2nd timestamp and 3rd timestamp > rate threshold?
139
n
y
Adding to the second level in the tree the second child node representing the second variable assigned the third value and connected by the second directed edge from the first parent node
141
Blocking adding to the second level in the tree a second child node representing the second variable assigned to the third value and connected by a second directed edge from the first parent node
140
Assigning to the second attribute associated with the first parent node a value indicating that the last attempt to add a child node connected by a directed edge from the first parent node was allowed at the third timestamp
142
Assigning to the first attribute associated with the first parent node a null value or deleting the first attribute
144
Assigning to the second attribute associated with the first parent node a value indicating that a last attempt to add a child node connected by a directed edge from the first parent node was blocked at the third timestamp
145

SELECTIVE ADDITION OF DATUM TO A TREE DATA STRUCTURE

CROSS-REFERENCE TO RELATED APPLICATIONS

N/A

BACKGROUND

In the domain of information security and information technology, there are many kinds of high dimension data logs. It may be useful to find unusual examples of various kinds of phenomena in the data logs. For example, it may be useful to identify data associated with unique, or relatively rare or infrequent and distinct or anomalous events. In computer systems it is often the case that a small number of variable instances are responsible for a disproportionate number of relationships with other variable instances within a given time interval. For example, with logon events, a small number of users may be associated with a disproportionate number of logons to distinct hosts. Additionally, a small number of hosts may be associated with a large number of logons from distinct users. For instance, a user that logs in frequently to different hosts, particularly at high rates, typifies a service account that is being used to distribute software to a large number of hosts. Similarly, a host that attracts logons from a large number of distinct users over a prolonged period of time is typified by servers such as Virtual Desktop Infrastructure (VDI) hosts, Terminal Services servers, and various other kinds of servers that can generally be referred to as bastion hosts. The phenomena that contribute to high dimensionality with high frequency might be short-lived ("bursty"), for example, in the case of a software or software update deployment event, or might be sustained over long periods of time, as in the case of logins to bastion hosts.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A depicts a flowchart of steps in accordance with embodiments of the invention.

FIG. 1C depicts a flowchart of steps in accordance with embodiments of the invention.

FIG. 1D depicts a flowchart of steps in accordance with embodiments of the invention.

FIG. 1E depicts a flowchart of steps in accordance with embodiments of the invention.

DETAILED DESCRIPTION

Figure 1B:
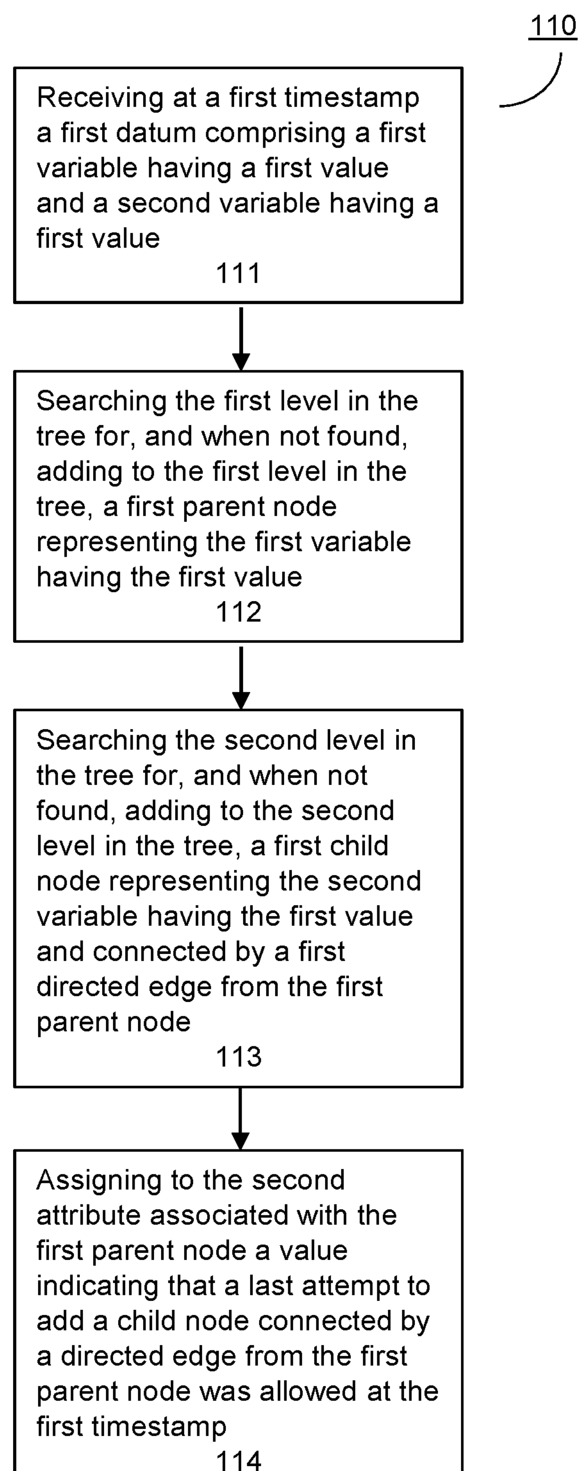
FIG. 1B depicts a flowchart of steps in accordance with embodiments of the invention.

As mentioned above, in the domain of information security and information technology, there are many kinds of high dimension data logs. It is desirable to find unusual examples of various kinds of phenomena in the data logs.

For example, it may be desirable to identify data associated with unique, or relatively rare or infrequent and distinct or anomalous events. However, it is challenging to find these phenomena because there are often many different variables involved that are considered dependently. Generally, the memory allocated for a data structure containing the data grows dimensionally with each independent variable. There is a tradeoff between the amount of memory allocated for the data structure and the capacity for "lookback" in the data structure, i.e., the maximum time over which events can be recalled deterministically in the data structure. What is needed is an approach that allocates sufficient memory and computing resources to a reduced, more relevant, data set. Doing so increases probabilistically the efficiency of successfully searching for unique or unusual events in a highly dimensioned data structure by filtering out variables with certain time-dependent inter-variable rate characteristics from the data structure.

Consider the case of detecting an "unusual" logon event where a user from a set of users ($u \in U$) logs into a computing host from a set of computing hosts ($h \in H$). In a data structure that is dimensioned by (U, H), that is, where an element of the data structure is considered distinct if either the user or the host in a logon event record is distinct, then the upper bound for the data structure size is $|U|$ times $|H|$. To simplify, assume that $|U|=|H|$, then the maximum size of the data structure is $|U|$ times $|U|$, or n times n, or simply, $n^2$.

However, in computer systems it is very often the case that a small number of variable instances are responsible for a disproportionate number of relationships with other variable instances within a given time interval. For example, with logon events, a small number of users may be associated with a disproportionate number of logons to distinct hosts. Additionally, a small number of hosts may be associated with a large number of logons from distinct users. For example, a user that logs in frequently to different hosts, particularly at high rates, typifies a service account that is being used to distribute software to a large number of hosts. Similarly, a host that attracts logons from a large number of distinct users over a prolonged period of time is typified by servers such as Virtual Desktop Infrastructure (VDI) hosts, Terminal Services servers, and various other kinds of servers that can generally be referred to as bastion hosts. The phenomena that contribute to high dimensionality with high frequency might be short-lived ("bursty"), for example, in the case of a software or software update deployment event, or might be sustained over long periods of time, as in the case of logins to bastion hosts.

Identifying and not adding, or selectively adding, such phenomena to a data structure dimensioned by (U, H) leads to a smaller memory footprint for the data structure and efficiency gains in searching for other distinct, and in particular, unusual, variable pairs that remain in the data structure. Events to be filtered (i.e., events not to be entered into the data structure) can be identified and filtered as described below. Rather than tracking (U, H) as a complex key indexing a simple table (aka map, aka dictionary), embodiments decouple the indexing of variables by replacing the indexed table with a tree structure with each variable associated with a different level of the tree. A leaf in this tree is therefore indexed by path (root→U→H) or shorthand that elides the root, (U→H).

A similar data structure may also or alternatively be constructed to track the hosts that are logged into by users (H→U) relationship in order to remove high frequency and distinct relationships that are more efficiently grouped in time as blocked on the H→U path in a tree data structure instead of the U→H path in the tree data structure, generally described as bastion hosts. The storage requirement for such a data structure is therefore similarly |H|/Tint.

By rejecting projected sources of high rate distinct variable relationships, a tree data structure that is maintained as described herein increases the lookback capacity significantly given a fixed storage constraint compared to accepting all values into the high dimensioned structure.

Furthermore, including the source host variable along with the user variable into the dimensioning of the tree data structure does not significantly increase the storage requirements (or reduce the lookback) of the tree data structure since very typically the source host and user are highly dependent variables. The tree data structure can therefore be described using a tree constructed by $H_{source}$→U→$H_{dest}$ with likely linear added storage cost.

Subject matter experts can find useful variable systems in computer systems and networks where the dimensionality might superficially appear high but where significant dependence between the variable dimensions exist, allowing for very high dimensioned tree data structures that have usefully large lookback given feasible and fixed storage constraints. It is contemplated that there are other applications that include useful models for variable systems common to information security data besides tracking user logons to particular hosts. Such models are considered generalizations of the example source-host→user→target-host model described herein.

With sufficient memory storage, vectors of variables that are distinct in many dimensions can be found to be unique over long lookback intervals with significantly reduced storage requirements compared to prior art systems. A cache miss in such a tree data structure maintained as described herein may be beneficial for detecting possible computer or network security-related anomalies or malicious behavior.

Figure 2:
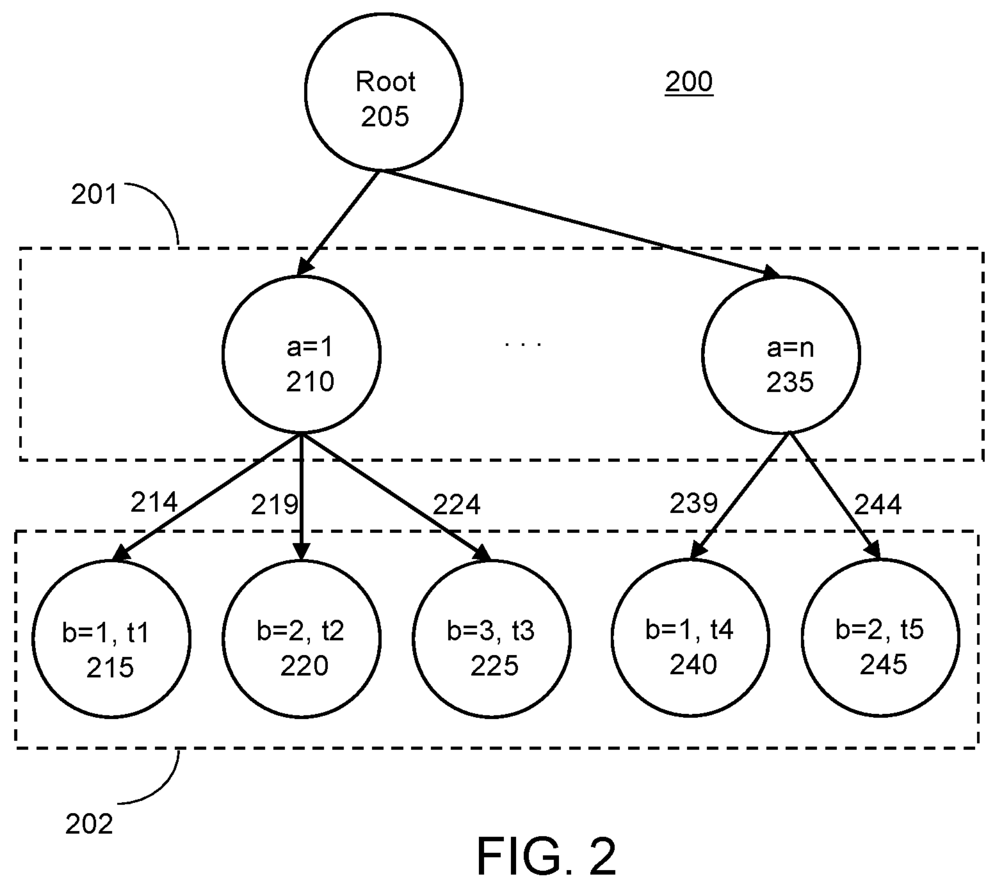
FIG. 2 depicts a tree data structure upon which an embodiment of the invention may be operated.

FIG. 1A is a flowchart 100 depicting the steps for adding datum (a piece of information) comprising a plurality of variables to a tree data structure ("tree") such as tree 200 depicted in FIG. 2, according to embodiments of the invention. Tree 200 comprises a root node 205 at the base, top, or origin of the tree. A next level 201 in the tree 200 comprises a plurality of parent nodes, e.g., parent nodes 210 and 235. Each parent node represents a distinct one of a plurality of values for a first of the plurality of variables stored in the tree 200. For example, at a first level 201 in the tree 200 below root node 205, a first parent node 210 represents a value of "1" for a first variable "a", and a second parent node 235 represents a value of "n" for the first variable "a". As an example, the first variable "a" may represent one of a plurality of distinct users associated with logon events to one of a plurality of hosts. So, the first parent node 210 representing a value of "1" for a first variable "a" may identify a first user, and the second parent node 235 representing a value of "n" for the first variable "a" may identify an $n^{th}$ user.

A second level 202 in the tree 200 comprises a plurality of child nodes, e.g., child nodes 215, 220, 225, 240 and 245. Each child node represents a distinct one of a plurality of values for a second of the plurality of variables stored in the tree 200. Further, each child node is connected by a directed edge from exactly one of the plurality of parent nodes. For example, at the second level 202 in the tree 200 below the first level 201 of parent nodes, a first child node 215 represents a value of "1" for a second variable "b" and is connected by directed edge 214 from parent node 210, a second child node 220 represents a value of "2" for the second variable "b" and is connected by a directed edge 219 from parent node 210, and a third child node 225 represents a value of "3" for the second variable "b" and is connected by a directed edge 224 from parent node 210. A fourth child node 240 represents a value of "1" for the second variable "b" and is connected by a directed edge 239 from parent node 235 that represents a value of "n" for the first variable "a", and a fifth child node 245 represents a value of "2" for the second variable "b" and is connected by a directed edge 244 from parent node 235. As an example, the second variable "b" may represent one of a plurality of distinct hosts associated with logon events with a plurality of users. So, the first child node 215 representing a value of "1" for a second variable "b" may identify a first host, a second child node 220 representing a value of "2" for the second variable "b" may identify a second host, a third child node 225 representing a value of "3" for the second variable "b" may identify a third host, and so on.

A similar data structure as tree 200 may be constructed where there is a root node 205 at the base, top, or origin of the tree, but the next level 201 in the tree 200 comprises a plurality of parent nodes, e.g., parent nodes 210 and 235 that represent one of a plurality of distinct hosts, and the second level 202 in the tree 200 comprises a plurality of child nodes, e.g., child nodes 215, 220, 225, 240 and 245 that represent a plurality of distinct users. Further, while the tree 200 depicts just two levels 201 and 202, is it contemplated that there may be further levels. For example, there may be upper levels between root 205 and levels 201 and 202. As one such example, a first level 101 may comprise nodes representing distinct source hosts, a second level may comprise nodes representing distinct users The parent nodes 210 and 235, and the child nodes 215, 220, 225, 240 and 245, are added to tree 200 according to the following steps. With reference to FIG. 1A, in an initial step 105, a value is assigned to a rate threshold for adding child nodes to a distinct parent node in the tree. Thus, a value is assigned to a first rate threshold for adding child nodes to parent node 210, and a value is assigned to a second, separate, rate threshold for adding child nodes to parent node 235. The values respectively assigned to the first and second rate thresholds may be the same or different from each other, and may be changed dynamically, depending, for example, on the size and/or rate of growth of tree 200 or one or more branches therein. It is contemplated that assigning a value to a rate threshold for adding child nodes to a distinct parent node in the tree may be responsive to a current rate, or a running average of the rate, at which child nodes are being added to the distinct parent node.

Consider tree 200 at a point in time when the tree is new and/or no datum has yet been added to the tree—just the root node 205 exists. Datum is added to the tree 200 as follows. At step 110, at a first timestamp (t=1), a first datum, comprising a first variable (a) assigned a first value (a=1) and a second variable (b) assigned a first value (b=1) is added to tree 200. This is accomplished in two steps. The first step adds to the first level 201 in the tree a first parent node 210 representing the first variable (a) assigned the first value (a=1). The second step adds to the second level 202 in the tree a first child node 215 representing the second variable (b) assigned the first value (b=1) and connects the first child node 215 to the first parent node 210 by a first directed edge 214 from the first parent node 210. In this manner, a parent node is added to a first level 201 to the tree 200 whenever there is a datum received with a first variable that has a new value, i.e., the first variable has a value that does not exist in, or is not represented by, any one of the parent nodes that exist in the tree at that point in time. Likewise, a first child node, connected by a directed edge to the newly added parent node, is added for the second variable in the received datum regardless of its assigned value, since no child nodes connected by a respective directed edge to the newly added parent node exist in the tree at that point in time.

After adding, at step 110, at the first timestamp (t=1), the first datum comprising the first variable (a) assigned the first value (a=1) and the second variable (b) assigned the first value (b=1) to the tree 200, a value is assigned to a first attribute ("last added child node") associated with the first parent node 210, at step 125. The assigned value indicates that the first child node 215 is a last child node added and connected by a directed edge (214 in this case) from the first parent node 210 at the first timestamp (t=1). The value of this attribute is considered later when subsequent additions to the tree are contemplated as described further below.

Step 110 is described in further detail with reference to FIG. 1B. In particular, the step 110 of adding the first datum to the tree 200 itself comprises three steps. The first step 111 involves receiving at a first timestamp (t=1) a first datum comprising a first variable (a) assigned a first value (a=1) and a second variable (b) assigned a first value (b=1). The process continues at step 112 by searching the first level 201 in the tree 200 for, and when not found, adding to the first level in the tree, a first parent node 210 representing the first variable (a) assigned the first value (a=1). The third step 113 involves searching the second level 202 in the tree 200 for, and when not found, adding to the second level in the tree, a first child node 215 representing the second variable (b) assigned the first value (b=1) and connecting the first child node 215 by a first directed edge 214 from the first parent node 210.

In some embodiments, step 113 may be followed by step 114 in which a second attribute (last block state) associated with the first parent node 210 is assigned a value indicating that a last attempt to add a child node connected by a directed edge from the first parent node 210 was allowed at the first timestamp (t=1). The value of this attribute is considered later when subsequent additions of child nodes to the first parent node are contemplated, as described below.

Consider tree 200 at a subsequent point in time, after only parent node 210 and child node 215 have been added as described above at a first timestamp (t=1), and further datum is then received and considered for addition to the tree 200 at a second timestamp (t=2). The process for adding the further datum to the tree continues as follows. With reference to FIG. 1A, at step 115, at a second timestamp (t=2), a second datum is received. The second datum, in this example, comprises a first and second variable. The first variable (a) in this example is assigned the same first value (a=1) that is assigned to the first variable of the first datum. The second variable (b) is assigned a second value (b=2). The second value (b=2) assigned to the second variable (b) of the second datum is distinct from the first value (b=1) assigned to the second variable of the first datum. The method blocks, at step 120, adding to the second level 202 in the tree 200 a second child node 220 representing the second variable (b) assigned the second value (b=2) that would be connected by a second directed edge 219 from the first parent node 210 when a rate based on the first timestamp (t=1) and the second timestamp (t=2) exceeds the rate threshold established at step 105. In this manner, a subsequent child node is added to the tree 200 and connected by a new directed edge to an existing parent node whenever there is a datum received with a first variable that has a value that is already assigned to the parent node in the tree, and the second variable has a value that is not yet assigned to a child node connected by a directed edge to the parent node in the tree, only when the rate is receipt of the first datum and the second datum is below the rate threshold. So high frequency events (where the rate threshold is exceeded) related to the parent node (representing the first variable) are filtered out.

Upon the method blocking at step 120 the addition to the second level 202 in the tree 200 the second child node 220 representing the second variable (b) assigned the second value (b=2) and connected by the second directed edge 219 from the first parent node 210, the process, at step 130, assigns to a second attribute (last block state) associated with the first parent node 210 a value indicating that a last attempt to add a child node connected by a directed edge from the first parent node 210 was blocked at the second timestamp (t=2). The value of this attribute is considered later when subsequent additions to this branch (parent node 210) of the tree 200 are contemplated as described further below. In this manner, a subsequent child node is added to the tree that has a distinct relationship with a parent node only when the rate at which the new datum is receives is below the rate threshold. High frequency events related to the parent node are, therefore, filtered out. Thus, a last child node is either added or blocked from being added to the tree 200 with a connection to a parent node (e.g., parent node 210) at t=2 based on rate threshold.

Further details following step 115 are described below with reference to FIG. 1C. Recall that at step 115, at a second timestamp (t=2), a second datum is received. The second datum, in this example, comprises the first variable (a) assigned the first value (a=1) and the second variable (b) assigned a second value (b=2). Thus, the first variable (a) of the second datum is assigned the same first value (a=1) that is assigned to the first variable of the first datum. However, the second value (b=2) assigned to the second variable (b) of the second datum is distinct from the first value (b=1) assigned to the second variable of the first datum.

Following receipt of the second datum, at step 118, the process searches the second level 202 in the tree 200 for a second child node 220 representing the second variable (b) assigned the second value (b=2) and connected by the second directed edge 219 from the first parent node 210 that represents the first variable (a) assigned the first value (a=1), and when not found, checks at step 119 whether the rate based on the first timestamp (t=1) and the second timestamp (t=2) exceeds the rate threshold. If the rate based on the first timestamp (t=1) and the second timestamp (t=2) exceeds the rate threshold, the process blocks at step 120 adding to the second level 202 in the tree 200 the second child node 220 representing the second variable (b) assigned the second value (b=2) and connected by the second directed edge 219 from the first parent node 210. However, if the check at step 119 indicates the rate based on the first timestamp (t=1) and the second timestamp (t=2) is below the rate threshold, the process adds at step 121 the second child node representing the second variable (b) assigned the second value (b=2) at the second level in the tree and connects the second child node 220 by the second directed edge 219 from the first parent node 210.

Following step 121, the process may, at step 122, assign to a first attribute (last added child node) associated with the first parent node 210 a value indicating the second child node 220 is a last child node added and connected by a directed edge from the first parent node 210 at the second timestamp (t=2). Additionally, the process may, at step 123, assign to a second attribute (last block state) associated with the first parent node 210 a value indicating that a last attempt to add a child node connected by a directed edge 219 from the first parent node 210 was allowed at the second timestamp (t=2).

Consider tree 200 at a subsequent point in time, after parent node 210 and child node 215 have been added at the first timestamp (t=1) as described above, and after child node 220 has been added or blocked at the second timestamp (t=2) as described above, when further datum is then received at a third timestamp (t=3) and considered for addition to the tree 200. The process for adding the further datum to the tree at third timestamp (t=3) proceeds as follows, with reference to FIG. 1D.

At step 135, a third datum is received at a third timestamp (t=3). The third datum comprises a first variable (a) assigned the same first value (a=1) as the first variable of the first datum and the second datum (a=1). The third datum further comprises a second variable (b) assigned a third value (b=3) that is distinct from the first value (b=1) assigned to the second variable of the first datum and distinct from the second value (b=2) assigned to the second variable of the second datum.

At step 140, the process blocks adding to the second level 202 in the tree a second child node representing the second variable (b) assigned to the third value (b=3) and connected by a second directed edge 224 from the first parent node 210 when a rate of receipt of data based on the second timestamp (t=2) and the third timestamp (t=3) exceeds the rate threshold. At step 145, the process then assigns to the second attribute (last block state) associated with the first parent node 210 a value indicating that a last attempt to add a child node connected by a directed edge from the first parent node 210 was blocked at the third timestamp (t=3).

Further details following step 135 are described below with reference to FIG. 1E. Recall that at step 135, at a third timestamp (t=3), a third datum is received. The third datum, in this example, comprises the first variable (a) assigned the first value (a=1) and the second variable (b) assigned a third value (b=3). Thus, the first variable (a) of the third datum is assigned the same first value (a=1) that is assigned to the first variable of the first datum. However, the third value (b=3) assigned to the second variable (b) of the third datum is distinct from the first value (b=1) assigned to the second variable of the first datum.

Following receipt of the third datum, at step 138, the process searches the second level 202 in the tree 200 for a child node, such as third child node 225, representing the second variable (b) assigned the third value (b=3) that would be connected by the third directed edge 224 from the first parent node 210 that represents the first variable (a) assigned the first value (a=1). If the child node 225 is not found, the process checks at step 139 whether the rate based on the second timestamp (t=2) and the third timestamp (t=3) exceeds the rate threshold. If the rate based on the second timestamp (t=2) and the third timestamp (t=3) exceeds the rate threshold, the process blocks at step 140 adding to the second level 202 in the tree 200 the child node 225 representing the second variable (b) assigned the third value (b=3) and connected by the third directed edge 224 from the first parent node 210. However, if the check at step 139 indicates the rate based on the second timestamp (t=2) and the third timestamp (t=3) is below the rate threshold, the process adds at step 141 the child node 225 representing the second variable (b) assigned the third value (b=3) at the second level 202 in the tree and connects the child node 225 by the third directed edge 224 from the first parent node 210. Following step 141, the process may, at step 142, assign to a second attribute (last block state) associated with the first parent node 210 a value indicating that a last attempt to add a child node connected by a directed edge 224 from the first parent node 210 was allowed at the third timestamp (t=3).

As discussed above, if the rate based on the second timestamp (t=2) and the third timestamp (t=3) exceeds the rate threshold, the process blocks at step 140 adding to the second level 202 in the tree 200 the child node 225 representing the second variable (b) assigned the third value (b=3) and connected by the third directed edge 224 from the first parent node 210. Accordingly, the process may reset the first attribute (last added child node) associated with the first parent node 210 to indicate that the last child node that was attempted to be added to the first parent node 210 was in fact not added. At step 144, the first attribute may be reset by assigning it a null value or simply deleting the first attribute.

Figure 3:
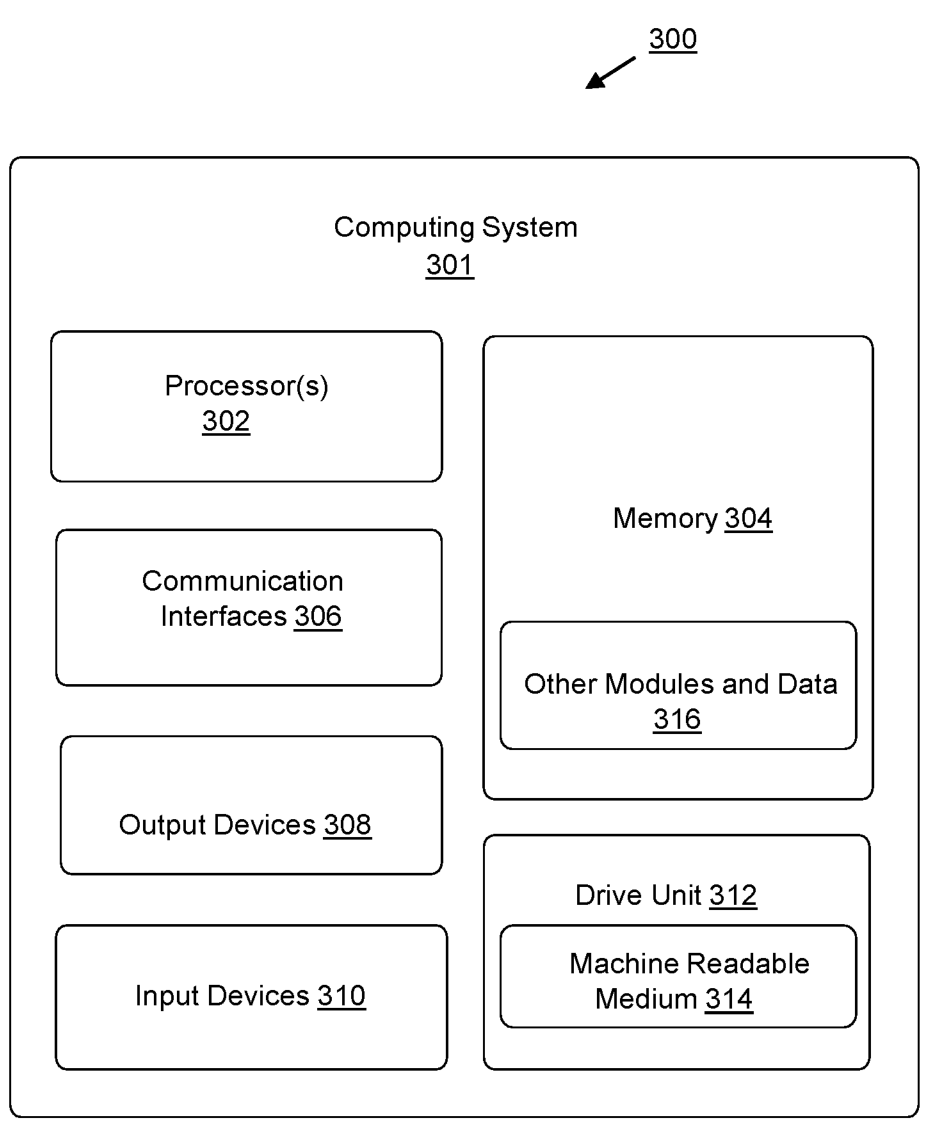
FIG. 3 is a functional block diagram of a computing system via which embodiments may be realized.

FIG. 3 shows an example system architecture 300 for a computing system 301 associated with the embodiments described herein. The computing system 301 can be a server, computer, or other type of computing device that executes one or more instances of the described embodiments. In some examples, the embodiments can be executed by a dedicated computing system 301. In other examples, the computing system 301 can execute one or more instances of embodiments via virtual machines or other virtualized instances. For instance, the computing system 301 may execute multiple instances of embodiments in parallel, using different virtual machines, parallel threads, or other parallelization techniques.

The computing system 301 includes memory 304 in which a tree data structure 200 may be maintained. In various examples, the memory 304 can include system memory, which may be volatile (such as RAM), non-volatile (such as ROM), flash memory, non-volatile memory express (NVMe), etc.) or some combination of the two. The memory 304 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 301. Any such non-transitory computer-readable media may be part of the computing system 301.

The memory 304 can store data associated with elements of the embodiments disclosed herein. The memory 304 can also store other modules and data 316. The modules and data 316 can include any other modules and/or data that can be utilized by the computing system 301 to perform or enable performing the actions described herein. Such other modules and data can include a platform, operating system, and applications, and data utilized by the platform, operating system, and applications.

By way of a non-limiting example, the computing system 301 that executes embodiments described herein may have non-volatile memory, such as an NVMe disk configured to store elements of the embodiments disclosed herein. The computing system 301 also have volatile memory, such as synchronous dynamic RAM (SDRAM), double data rate (DDR) SDRAM, DDR2 SDRAM, DDR3 SDRAM, or DD4SDRAM.

The computing system 301 can also have one or more processors 302. In various examples, each of the processors 302 can be a central processing unit (CPU), a graphics processing unit (GPU), both a CPU and a GPU, or any other type of processing unit. For example, each the processors 302 may be a 10-core CPU, or any other type of processor. Each of the one or more processors 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 302 may also be responsible for executing computer applications stored in the memory 304, which can be associated with types of volatile and/or non-volatile memory.

The computing system 301 can also have one or more communication interfaces 306. The communication interfaces 306 can include transceivers, modems, interfaces, antennas, telephone connections, and/or other components that can transmit and/or receive data over networks, telephone lines, or other connections. For example, the communication interfaces 306 can include one or more network cards that can be used to receive inputs and output results according to the above embodiments.

In some examples, the computing system 301 can also have one or more input devices 310, such as a keyboard, a mouse, a touch-sensitive display, voice input device, etc., and/or one or more output devices 308 such as a display, speakers, a printer, etc. These devices are well known in the art and need not be discussed at length here.

The computing system 301 may also include a drive unit 312 including a machine readable medium 314. The machine readable medium 314 can store one or more sets of instructions, such as software or firmware, that embodies any one or more of the methodologies or functions described herein. The instructions can also reside, completely or at least partially, within the memory 304, processor(s) 302, and/or communication interface(s) 306 during execution thereof by the computing system 301. The memory 304 and the processor(s) 302 also can constitute machine readable media 314.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method for adding datum comprising a plurality of associated or related variables to a tree data structure ("tree"), in which a first level in the tree comprises a plurality of parent nodes, each parent node representing a distinct one of a plurality of values for a first of the plurality of variables, and in which a second level in the tree comprises a plurality of child nodes, each child node representing a distinct one of a plurality of values for a second of the plurality of variables that is different than the first of the plurality of variables, and each child node connected by a directed edge with one of the plurality of parent nodes where a distinct one of the plurality of values for the first of the plurality of variables is associated with or related to the distinct one of the plurality of values for the second of the plurality of variables, the computer-implemented method comprising:

identifying and selectively blocking adding to the tree datum comprising a plurality of associated or related variables relating to a user logging in to a plurality of computers to distribute software to or update software on the plurality of computers, or datum comprising a plurality of associated or related variables relating to a plurality of users all logging in to a same computer used as a bastion host, while limiting memory allocated to the tree, limiting computing resources allocated to accessing the tree in memory, and increasing a probability of successfully searching for datum comprising a plurality of associated and related variables relating to unique, infrequent, distinct, or anomalous events, by identifying and selectively adding to the tree datum comprising the plurality of associated and related variables relating to the unique, infrequent, distinct, or anomalous events, by:

for each of the plurality of parent nodes in the first level in the tree:

assigning a value to a respective one of a plurality of rate threshold variables for adding child nodes to the parent node in the tree;

adding, at a first timestamp (t1), a first datum, comprising a first variable (a) assigned a first value (a1) and a second variable (b) assigned a first value (b1), to the tree, by adding to the first level in the tree the parent node representing the first variable (a) assigned the first value (a1) and then adding to the second level in the tree a first child node representing the second variable (b) assigned the first value (b1) and connected by a first directed edge with the parent node where the first variable (a) assigned the first value (a1) is associated with or related to the second variable (b) assigned the first value (b1);

receiving at a second timestamp (t2) a second datum comprising the first variable (a) assigned the first value (a1) and the second variable (b) assigned a second value (b2) that is distinct from the first value (b1) assigned to the second variable of the first datum;

blocking, when a rate based on the first timestamp (t1) and the second timestamp (t2) exceeds the value assigned to the respective rate threshold variable, adding to the second level in the tree a second child node representing the second variable (b) assigned the second value (b2) and connected by a second directed edge with the parent node where the first variable (a) assigned the first value (a1) is associated with or related to the second variable (b) assigned the second value (b2); and adding, when the rate based on the first timestamp (t1) and the second timestamp (t2) is less than the value assigned to the respective rate threshold variable, to the second level in the tree the second child node representing the second variable (b) assigned the second value (b2) and connected by the second directed edge with the parent node where the first variable (a) assigned the first value (a1) is associated with or related to the second variable (b) assigned the second value (b2).

2. The method of claim 1, wherein adding, at the first timestamp (t1), the first datum, comprising the first variable (a) assigned the first value (a1) and the second variable (b) assigned the first value (b1), to the tree, further comprises assigning to a first attribute (last added child node) associated with the parent node a value indicating the first child node is a last child node added and connected by a directed edge with the parent node at the first timestamp (t1).

3. The method of claim 2, wherein blocking, when the rate based on the first timestamp (t1) and the second timestamp (t2) exceeds the value assigned to the respective rate threshold variable, adding to the second level in the tree the second child node representing the second variable (b) assigned the second value (b2) and connected by the second directed edge with the parent node, further comprises assigning to a second attribute (last block state) associated with the parent node a value indicating that a last attempt to add a child node connected by a directed edge with the parent node was blocked at the second timestamp (t2).

4. The method of claim 1, wherein adding the first datum to the tree comprises:

receiving at the first timestamp (t1) the first datum comprising the first variable (a) assigned the first value (a1) and the second variable (b) assigned the first value (b1);

searching the first level in the tree for, and when not found, adding to the first level in the tree, the parent node representing the first variable (a) assigned the first value (a1); and searching the second level in the tree for, and when not found, adding to the second level in the tree, the first child node representing the second variable (b) assigned the first value (b1) and connected by the first directed edge with the parent node.

5. The method of claim 1, wherein blocking, when the rate based on the first timestamp (t1) and the second timestamp (t2) exceeds the value assigned to the respective rate threshold variable, adding to the second level in the tree the second child node representing the second variable (b) assigned the second value (b2) and connected by the second directed edge with the parent node, comprises:

searching the second level in the tree for the second child node representing the second variable (b) assigned the second value (b2) and connected by the second directed edge with the parent node, and when not found, when the rate based on the first timestamp (t1) and the second timestamp (t2) exceeds the value assigned to the respective rate threshold variable, blocking adding to the second level in the tree the second child node representing the second variable (b) assigned the second value (b2) and connected by the second directed edge with the parent node.

6. The method of claim 5, wherein searching the second level in the tree for the second child node representing the second variable (b) assigned the second value (b2) and connected by the second directed edge with the parent node, and when not found, the method further comprising:

when the rate based on the first timestamp (t1) and the second timestamp (t2) is below the rate threshold, adding to the second level in the tree the second child node representing the second variable (b) assigned the second value (b2) and connected by the second directed edge with the parent node.

7. The method of claim 6, further comprising assigning to a first attribute (last added child node) associated with the parent node a value indicating the second child node is a last child node added and connected by a directed edge with the parent node at the second timestamp (t2).

8. The method of claim 7, further comprising assigning to a second attribute (last block state) associated with the parent node a value indicating that a last attempt to add a child node connected by a directed edge with the parent node was allowed at the second timestamp (t2).

9. The method of claim 3, further comprising:

receiving at a third timestamp (t3) a third datum comprising the first variable (a) assigned the first value (a1) and the second variable (b) assigned a third value (b3) that is distinct from the first value (b1) assigned to the second variable of the first datum;

blocking, when a rate based on the second timestamp (t2) and the third timestamp (t3) exceeds the value assigned to the respective rate threshold variable, adding to the second level in the tree a second child node representing the second variable (b) assigned to the third value (b3) and connected by a second directed edge with the parent node; and assigning to the second attribute (last block state) associated with the parent node a value indicating that a last attempt to add a child node connected by a directed edge with the parent node was blocked at the third timestamp (t3).

10. The method of claim 9, wherein blocking, when the rate based on the second timestamp (t2) and the third timestamp (t3) exceeds the value assigned to the respective rate threshold variable, adding to the second level in the tree the second child node representing the second variable (b) assigned the third value (b3) and connected by the second directed edge with the parent node, comprises:

searching the second level in the tree for the second child node representing the second variable (b) assigned the third value (b3) and connected by the second directed edge with the parent node, and when not found, when the rate based on the second timestamp (t2) assigned to the first attribute (last added child node) or the second attribute (last block state), and the third timestamp (t3), exceeds the value assigned to the respective rate threshold variable, assigning to the second attribute (last block state) associated with the parent node a value indicating that the last attempt to add a child node connected by a directed edge with the parent node was blocked at the third timestamp (t3).

11. The method of claim 10, wherein searching the second level in the tree for a second child node representing the second variable (b) assigned the third value (b3) and connected by the second directed edge with the parent node and when not found, further comprises:

when the rate based on the second timestamp (t2) assigned to the first attribute (last added child node) or the second attribute (last block state), and the third timestamp (t3), is below the value assigned to the respective rate threshold variable:

adding to the second level in the tree the second child node representing the second variable (b) assigned the third value (b3) and connected by the second directed edge with the parent node; and assigning to the second attribute (last block state) associated with the parent node a value indicating that the last attempt to add a child node connected by a directed edge with the parent node was allowed at the third timestamp (t3).

12. The method of claim 9, wherein searching the second level in the tree for the second child node representing the second variable (b) assigned the third value (b3) and connected by the second directed edge with the parent node and when not found, when the rate based on the second timestamp (t2) assigned to the first attribute (last added child node) or the second attribute (last block state), and the third timestamp (t3), exceeds the value assigned to the respective rate threshold variable, further comprises assigning to the first attribute (last added child node) associated with the parent node a null value or deleting the first attribute.

13. The method of claim 1, wherein assigning the value to the respective rate threshold variable for adding child nodes to the parent node in the tree, comprises assigning the value to the respective rate threshold variable responsive to a current rate at which child nodes are being added to the parent node.

14. The method of claim 4, wherein searching the second level in the tree for, and when not found, adding to the second level in the tree, the first child node representing the second variable (b) assigned the first value (b1) and connected by the first directed edge with the parent node, further comprises assigning to the second attribute (last block state) associated with the parent node a value indicating that a last attempt to add a child node connected by a directed edge with the parent node was allowed at the first timestamp (t1).

15. A non-transitory computer-readable media storing computer-executable instructions that, when executed by one or more processors, cause the one or more processors to add datum comprising a plurality of associated or related variables to a tree data structure ("tree"), in which a first level in the tree comprises a plurality of parent nodes, each parent node representing a distinct one of a plurality of values for a first of the plurality of variables, and in which a second level in the tree comprises a plurality of child nodes, each child node representing a distinct one of a plurality of values for a second of the plurality of variables that is different than the first of the plurality of variables, and each child node connected by a directed edge with one of the plurality of parent nodes where a distinct one of the plurality of values for the first of the plurality of variables is associated with or related to the distinct one of the plurality of values for the second of the plurality of variables, the instructions to cause the one or more processors to perform operations comprising:

identifying and selectively blocking adding to the tree datum comprising a plurality of associated or related variables relating to a user logging in to a plurality of computers to distribute software to or update software on the plurality of computers, or datum comprising a plurality of associated or related variables relating to a plurality of users all logging in to a same computer used as a bastion host, while limiting memory allocated to the tree, limiting computing resources allocated to accessing the tree in memory, and increasing a probability of successfully searching for datum comprising a plurality of associated and related variables relating to unique, infrequent, distinct, or anomalous events, by identifying and selectively adding to the tree datum comprising the plurality of associated and related variables relating to the unique, infrequent, distinct, or anomalous events, by:

for each of the plurality of parent nodes in the first level of the tree:

assigning a value to a rate threshold for adding child nodes to a distinct parent node in the tree;

adding, at a first timestamp (t1), a first datum, comprising a first variable (a) assigned a first value (a1) and a second variable (b) assigned a first value (b1), to the tree, by adding to the first level in the tree the parent node representing the first variable (a) assigned the first value (a1) and then adding to the second level in the tree a first child node representing the second variable (b) assigned the first value (b1) and connected by a first directed edge with the parent node where the first variable (a) assigned the first value (a1) is associated with or related to the second variable (b) assigned the first value (b1);

receiving at a second timestamp (t2) a second datum comprising the first variable (a) assigned the first value (a1) and the second variable (b) assigned a second value (b2) that is distinct from the first value (b1) assigned to the second variable of the first datum;

blocking, when a rate based on the first timestamp (t1) and the second timestamp (t2) exceeds the value assigned to the respective rate threshold variable, adding to the second level in the tree a second child node representing the second variable (b) assigned the second value (b2) and connected by a second directed edge with the parent node where the first variable (a) assigned the first value (a1) is associated with or related to the second variable (b) assigned the second value (b2); and adding, when the rate based on the first timestamp (t1) and the second timestamp (t2) is less than the value assigned to the respective rate threshold variable, to the second level in the tree the second child node representing the second variable (b) assigned the second value (b2) and connected by the second directed edge with the parent node where the first variable (a) assigned the first value (a1) is associated with or related to the second variable (b) assigned the second value (b2).

16. The non-transitory computer-readable media of claim 15, wherein adding, at the first timestamp (t1), the first datum, comprising the first variable (a) assigned the first value (a1) and the second variable (b) assigned the first value (b1), to the tree, further comprises assigning to a first attribute (last added child node) associated with the parent node a value indicating the first child node is a last child node added and connected by a directed edge with the parent node at the first timestamp (t1).

17. The non-transitory computer-readable media of claim 16, wherein blocking, when the rate based on the first timestamp (t1) and the second timestamp (t2) exceeds the value assigned to the respective rate threshold variable, adding to the second level in the tree the second child node representing the second variable (b) assigned the second value (b2) and connected by the second directed edge the parent node, further comprises assigning to a second attribute (last block state) associated with the parent node a value indicating that a last attempt to add a child node connected by a directed edge with the parent node was blocked at the second timestamp (t2).

18. The non-transitory computer-readable media of claim 15, wherein blocking, when the rate based on the first timestamp (t1) and the second timestamp (t2) exceeds the rate threshold, adding to the second level in the tree the second child node representing the second variable (b) assigned the second value (b2) and connected by the second directed edge with the parent node, comprises:

searching the second level in the tree for the second child node representing the second variable (b) assigned the second value (b2) and connected by the second directed edge with the parent node, and when not found, when the rate based on the first timestamp (t1) and the second timestamp (t2) exceeds the value assigned to the respective rate threshold variable, blocking adding to the second level in the tree the second child node representing the second variable (b) assigned the second value (b2) and connected by the second directed edge with the parent node.

19. The non-transitory computer-readable media of claim 18, wherein searching the second level in the tree for the second child node representing the second variable (b) assigned the second value (b2) and connected by the second directed edge with the parent node, and when not found, further comprising:

when the rate based on the first timestamp (t1) and the second timestamp (t2) is below the value assigned to the respective rate threshold variable, adding to the second level in the tree the second child node representing the second variable (b) assigned the second value (b2) and connected by the second directed edge with the parent node.

20. The non-transitory computer-readable media of claim 17, further comprising:

receiving at a third timestamp (t3) a third datum comprising the first variable (a) assigned the first value (a1) and the second variable (b) assigned a third value (b3) that is distinct from the first value (b1) assigned to the second variable of the first datum;

blocking, when a rate based on the second timestamp (t2) and the third timestamp (t3) exceeds the value assigned to the respective rate threshold variable, adding to the second level in the tree a second child node representing the second variable (b) assigned to the third value (b3) and connected by a second directed edge with the parent node; and assigning to the second attribute (last block state) associated with the parent node a value indicating that a last attempt to add a child node connected by a directed edge with the parent node was blocked at the third timestamp (t3).

21. A computer-implemented method for adding datum comprising a user variable and a host variable to a tree data structure ("tree"), in which a first level in the tree comprises a plurality of parent nodes, each parent node representing a distinct one of a plurality of values for the user variable that identifies a distinct one of a plurality of users, and in which a second level in the tree comprises a plurality of child nodes, each child node representing a distinct one of a plurality of values for the host variable that identifies a distinct one of a plurality of hosts and connected by a directed edge from one of the plurality of parent nodes where a user identified by the distinct one of the plurality of values for the user variable has logged on to a host identified by the distinct one of the plurality of values for the host variable, the computer-implemented method comprising:

identifying and selectively blocking adding to the tree datum comprising a plurality of associated or related variables relating to a user logging in to a plurality of computers to distribute software to or update software on the plurality of computers, or datum comprising a plurality of associated or related variables relating to a plurality of users all logging in to a same computer used as a bastion host, while limiting memory allocated to the tree, limiting computing resources allocated to accessing the tree in memory, and increasing a probability of successfully searching for datum comprising a plurality of associated and related variables relating to unique, infrequent, distinct, or anomalous events, by identifying and selectively adding to the tree datum comprising the plurality of associated and related variables relating to the unique, infrequent, distinct, or anomalous events, by:

for each of the plurality parent nodes in the first level in the tree:

assigning a value to a respective one of a plurality of rate threshold variables for adding child nodes to the parent node in the tree;

adding, at a first timestamp, a first datum, comprising a user variable assigned a first value identifying a distinct one of the plurality of users and a host variable assigned a first value identifying a first distinct one of the plurality of hosts, to the tree, by adding to the first level in the tree the parent node representing the user variable assigned the first value identifying the distinct one of the plurality of users and then adding to the second level in the tree a first child node representing the host variable assigned the first value identifying the distinct one of the plurality of hosts and connected by a first directed edge with the parent node where the distinct one of the plurality of users identified by the first value for the user variable has logged on to the first distinct one of the plurality of hosts identified by the first value assigned to the host variable;

receiving at a second timestamp a second datum comprising a user variable assigned the first value identifying the distinct one of the plurality of users and a host variable assigned a second value identifying a second distinct one of the plurality of hosts different than the first value identifying the first distinct one of the plurality of hosts assigned to the host variable of the first datum; and blocking, when a rate based on the first timestamp and the second timestamp exceeds the value assigned to the respective rate threshold variable, adding to the second level in the tree a second child node representing the host variable assigned the second value identifying the second distinct one of the plurality of hosts and connected by a second directed edge with the parent node where the distinct one of the plurality of users identified by the first value for the user variable has logged on to the second distinct one of the plurality of hosts identified by the second value assigned to the host variable.

* * * * *